United States Patent [19]

Rueb

[11] Patent Number: 5,577,428
[45] Date of Patent: Nov. 26, 1996

[54] PORTABLE SAW GUIDE APPARATUS

[76] Inventor: Jacob Rueb, 107 E. Bowen Ave., #306, Bismarck, N. Dak. 58504

[21] Appl. No.: 326,868

[22] Filed: Oct. 21, 1994

[51] Int. Cl.⁶ .................................................. B26D 7/01
[52] U.S. Cl. ............................ 83/449; 83/574; 83/485; 83/468.4; 144/286.5
[58] Field of Search ........................... 83/471.2, 471.3, 83/473, 474, 477.1, 484, 485, 455, 456, 581, 477, 563, 564, 468.7, 468.3, 468.4, 574, 449; 269/60; 144/287, 286.1, 286.5

[56] References Cited

U.S. PATENT DOCUMENTS

| | | | |
|---|---|---|---|
| 3,538,963 | 11/1970 | Adams | 83/473 |
| 4,133,237 | 1/1979 | Lewin | 83/471.3 X |
| 4,807,506 | 2/1989 | Audet | 83/486.1 |
| 5,394,781 | 3/1995 | Tsubai | 83/471.3 X |
| 5,442,984 | 8/1995 | Tate | 83/471.2 X |

FOREIGN PATENT DOCUMENTS 499046 of 1920 France.

Primary Examiner—Rinaldi I. Rada
Assistant Examiner—Boyer Ashley
Attorney, Agent, or Firm—David A. Lingbeck

[57] ABSTRACT

A portable saw guide apparatus comprises a frame assembly having four leg members and a pair of cantilever arms fixedly attached to the top of the frame assembly and extending generally horizontally above the leg members and further comprises rails spaced apart to slidably receive a carriage which supports a power saw and also comprises a crank connected to a lever which is connected to a pair of linkage members which is connected to a pair of spindles having four workpiece support mounts attached to two cylindrical workpiece support members which support the workpiece rest and/or the workpiece and raises and lowers the workpiece relative to the cantilever arms and rails and the power saw to effect cuts through many different thicknesses of structural materials.

12 Claims, 5 Drawing Sheets

PORTABLE SAW GUIDE APPARATUS

BACKGROUND OF THE INVENTION

This invention relates to a portable saw guide apparatus for supporting and operating a circular hand saw to cut structural materials or workpieces as such.

The prior art describes constructions of saw guides which support circular hand saws for cutting structural materials, all of which do not suggest or anticipate a saw guide apparatus which can be conveniently adjusted to cut different thicknesses of structural materials or to cut angles or other configurations including cutting grooves in the structural materials without sacrificing safety to the user.

One known prior art are SAW TABLES, U.S. Pat. No. 4,007,657, which comprises a base, a pair of guides, and a support plate to support the saw. The base is not adjustable relative to the guides.

Another known prior art is a MITER TABLE FOR PORTABLE CIRCULAR SAW, U.S. Pat. No. 4,109,901, which comprises an arm movable in a vertical plane and pivotal on a horizontally disposed base and comprises a fence for holding the materials to be cut, and also comprises a carriage mounted upon the arm for supporting the saw.

Another known prior art is a PORTABLE SAWING DEVICE UTILIZING A CIRCULAR POWER SAW, U.S. Pat. No. 4,587,875, which comprises a frame clampable to a workpiece support bench and comprising a supporting arm cantilevered upon a column carried by a cross member which is attached to the support bench, an adapter plate mounted upon the supporting arm and supporting the circular power saw.

Another known prior art is a PORTABLE SAW TABLE, U.S. Pat. No. 4,807,506, which comprises a carriage extending above the table for supporting the saw.

Another known prior art is a SAW GUIDE, U.S. Pat. No. 4,995,288, which comprises a base, a pair of parallel guide rails fixedly attached to and spaced above the base, and a means for independently adjusting the height of each guide rail above the base.

Another known prior art is a SAW GUIDE APPARATUS, U.S. Pat. No. 5,062,339, which comprises a planar support base and a pair of track members mounted upon the support base.

None of the prior art describes or suggests the portable saw guide apparatus of the present invention, which allows the user to quickly and conveniently adjust the height of the workpiece relative to the saw which cannot be vertically adjusted to cut and shape many different thicknesses of workpieces.

SUMMARY OF THE INVENTION

The present invention relates to a portable saw guide apparatus which comprises a frame assembly; three rail means fixedly attached to the top of the frame assembly for supporting a removable carriage upon which a hand-held circular power saw is removeably mounted; and a means to vertically adjust the workpiece relative to the power saw to cut and shaped many different thicknesses of structural materials or workpieces.

One objective of the present invention is to provide a portable saw guide apparatus which allows the user to cut structural materials having many different thicknesses.

Also, another objective of the present invention is to provide a portable saw guide apparatus which allows the user to conveniently make slots or grooves in structural materials having varying thicknesses by vertically adjusting the structural materials relative to the saw.

Further, another objective of the present invention is to provide a portable saw guide apparatus which allows the user to move the saw horizontally forward or back and side to side upon the rail means.

Also, another objective of the present invention is to provide a portable saw guide apparatus which is capable of securely locking the saw at selected positions upon the rail means to function much like a table saw.

Yet, another objective of the present invention is to provide a portable saw guide apparatus which substantially minimizes any possibility of injury to the user since the power saw cannot be adjusted vertically relative to the workpiece.

Further objects and advantages of the present invention will become apparent as the description proceeds and when taken in conjunction with the accompanying drawings wherein:

DETAILED DESCRIPTION OF THE INVENTION

Figure 1:
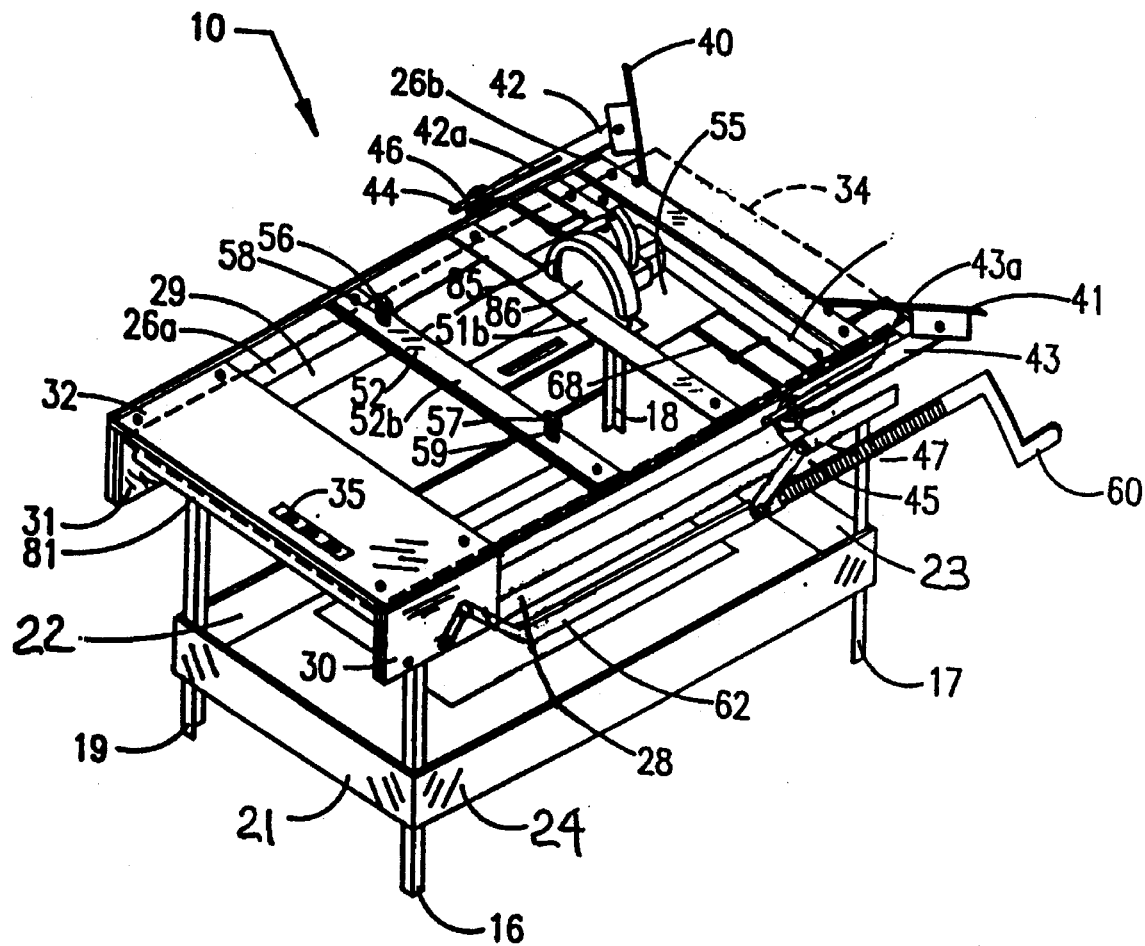
FIG. 1 is a top perspective view of the portable saw guide apparatus.

Referring to FIGS. 1 through 5 of the drawings, this invention relates to a portable saw guide apparatus 10 comprising a frame assembly 15 having four leg members 16–19 spaced apart and interconnected by at least four cross members 21–24 which support the leg members 16–19, and further having a pair of elongate support means 28,29 such as angle irons; wherein, each elongate support means 28,29 has two ends which are fixedly attached with bolts as such to the tops 16a–19a of two leg members 16–19, the frame assembly 15 further having two planer arm mounts 30,31 fixedly fastened with bolts or the like to the elongate support means 28,29 or angle irons near one of the ends of the elongate support means 28,29 and being disposed generally parallel to the leg members 16–19 and being laterally aligned to one another, the frame assembly 15 also having two cantilever arms 25,26 having first ends 25a,26a and second ends 25b,26b, the first ends 25a, 26a being fixedly fastened with bolts or the like along the top edge of the planer arm mounts 30,31, the cantilever arms 25,26 extending parallel in relationship to one another and extending generally horizontally above the leg members 16–19 and the elongate support means 28,29 and further being interconnected by a planer arm brace 32 which is fixedly fastened with bolts or the like to the cantilever arms 25,26 and the planer arm mounts 30,31 and which is disposed generally perpendicular to the planer arm mounts 30,31 to support an power outlet strip and switch 35 which is fixedly fastened to the top of the planer arm brace 32. Workpiece guide means are pivotally mounted at the second ends 25b,26b of the cantilever arms 25,26. The workpiece guide means comprises two guide members 40,41 which are pivotally attached to two guide arms 42,43 each having a longitudinal slot 42a,43a extending therein for slidably receiving an arm fastening means 44,45 which is threaded through a bracket 46,47 fixedly attached to a cantilever arm 25 or 26, each arm fastening means 44,45 being engageable to the respective guide arm 42,43 to immovably secure the respective guide arm 42,43 and the guide member 40,41 at a selected angle relative to and in the same plane as the respective cantilever arm 25 or 26. Two arm supports 38,39 are pivotally attached to the two elongate support means 28,29 with fasteners and are engageable to the cantilever arms 25,26 to further support the cantilever arms 25,26, the arm supports 38,39 being spaced from the arm mounts 30,31 and being pivotally mounted near the second ends 25b,26b of the cantilever arms 25,26.

Figure 3:
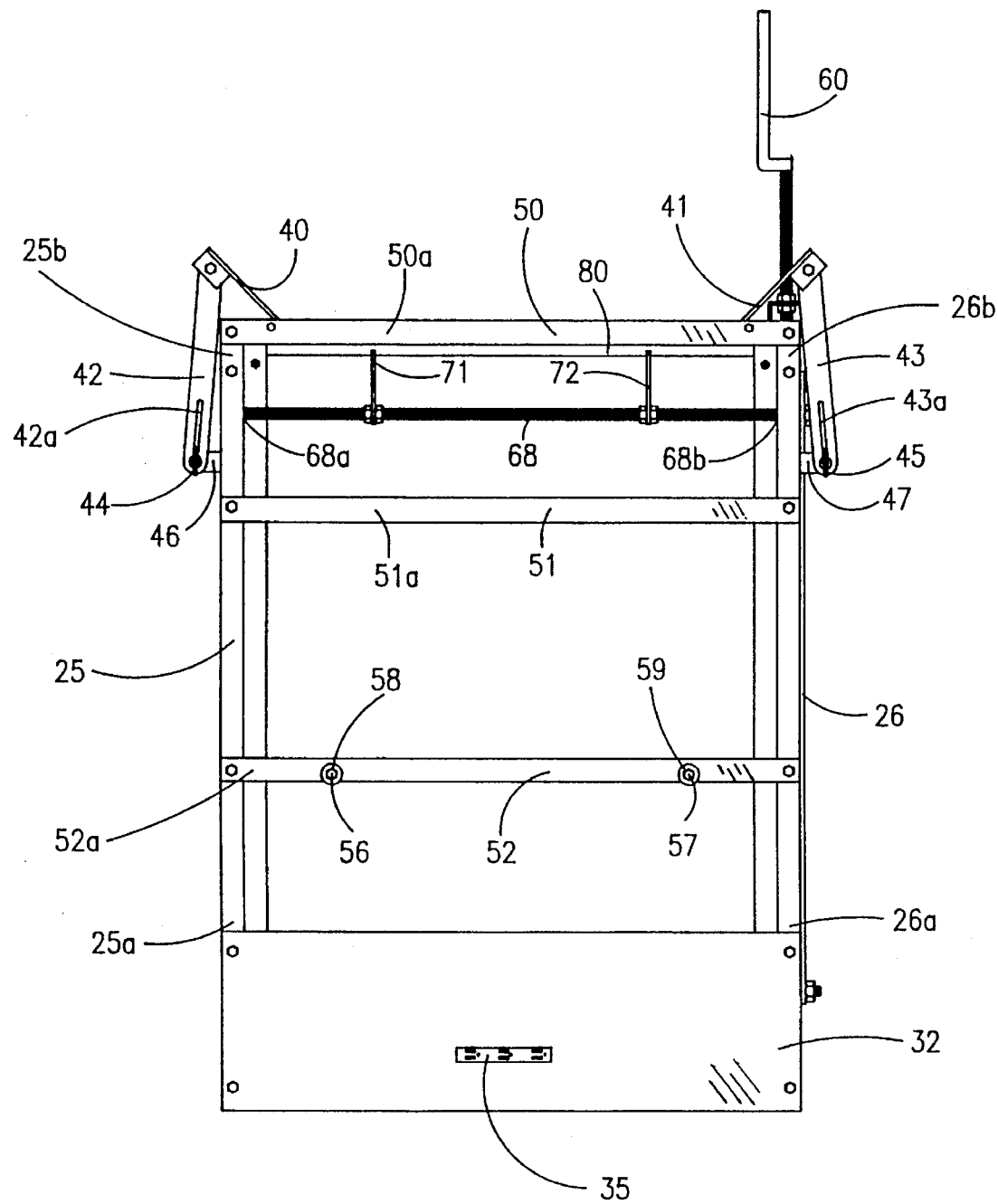
FIG. 3 is a top plan view of the portable saw guide apparatus.
Figure 5:
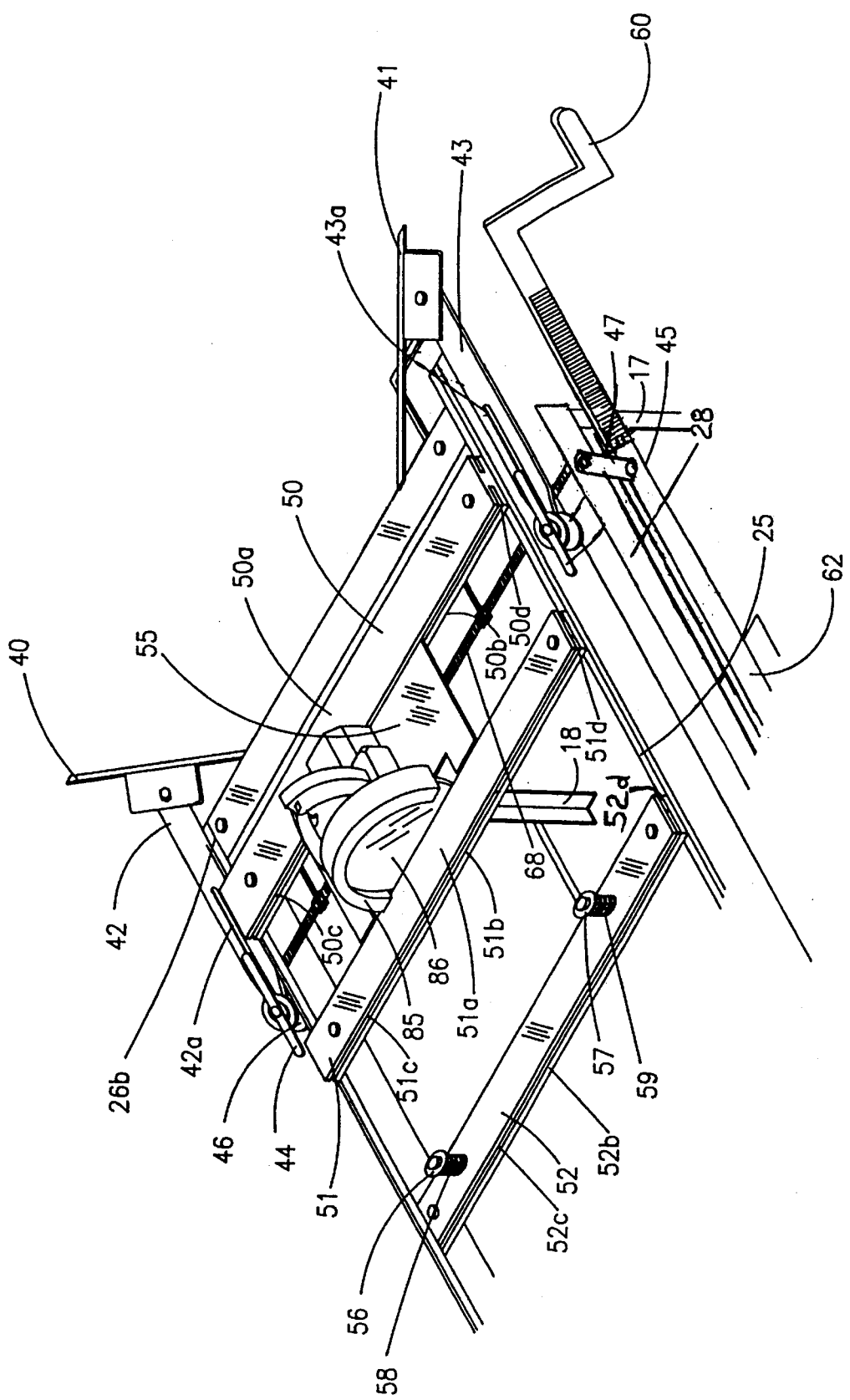
FIG. 5 is a detailed perspective view of the rail means and means to immovably secure the carriage upon the rail means of the portable saw guide means.

As shown in FIGS. 1, 3, and 5, the portable saw guide apparatus 10 further comprises three rail means 50,51,52 each having a top elongate, generally flat strip 50a,51a,52a and a bottom elongate, generally flat strip 50b,51b,52b and a spacer member 50c,51c,52c engaged between the top strips 50a,51a,52a and bottom strips 50b,51b,52b all of which are preferably made of metal, a longitudinal slot 50d,51d,52d being formed between the two strips, each of the longitudinal slots 50d,51d,52d being dimensioned and adapted to receive an edge portion of a planer carriage 55 upon which a hand-held power circular saw 85 is fixedly mounted with bolts and screws or the like and has a power cord which can be detachably connected to the power outlet strip and switch 35 which energizes the power saw 85, the planer carriage 55 being slidable along the rail means 50,51,52. Two of the rail means 50,51 are spaced apart from one another in such a manner so that the cutting means 86 of the saw 85 mounted upon the planer carriage 55 which is slidably received on the rail means 50,51 is disposed generally perpendicular to the two cantilever arms 25,26. The third rail means 52 is spaced from one of the other two rail means 50,51 in such a manner such that the cutting means 86 of the saw 85 when slidably mounted upon the third rail means 52 is disposed generally parallel to the cantilever arms 25,26. The rail means 50,51,52 also comprises means for immovably securing the planer carriage 55 in a selected position upon the rail means 50,51,52. The means for immovably securing the planer carriage 55 comprises two threaded fasteners 56,57 spaced apart and extending through one of the rail means 52 and two compressible springs 58,59 disposed about the threaded fasteners 56,57 and mounted upon the rail means 52. The threaded fasteners 56,57 adjust the compression of the springs 58,59 which urge the two elongate strips of the rail means 52 toward one another for engagement to the edge portion of the planer carriage 55. The more the threaded fasteners 56,57 are threaded through the rail means 52 the more compression of the springs 58,59 which urges the top and bottom strips toward one another to lockingly engage the planer carriage 55 so that the plate-like carriage 55 becomes immovable upon the rail means 50,51, 52. The threaded fasteners 56,57 can also be adjustably threaded out of the rail means 52 to reduce the compression of the springs 58,59 and also reduce the pressure exerted by the springs 58,59 upon the rail means 52 so that the planer carriage 55 can be slid along the rail means 50,51,52 as desired by the user.

Figure 2:
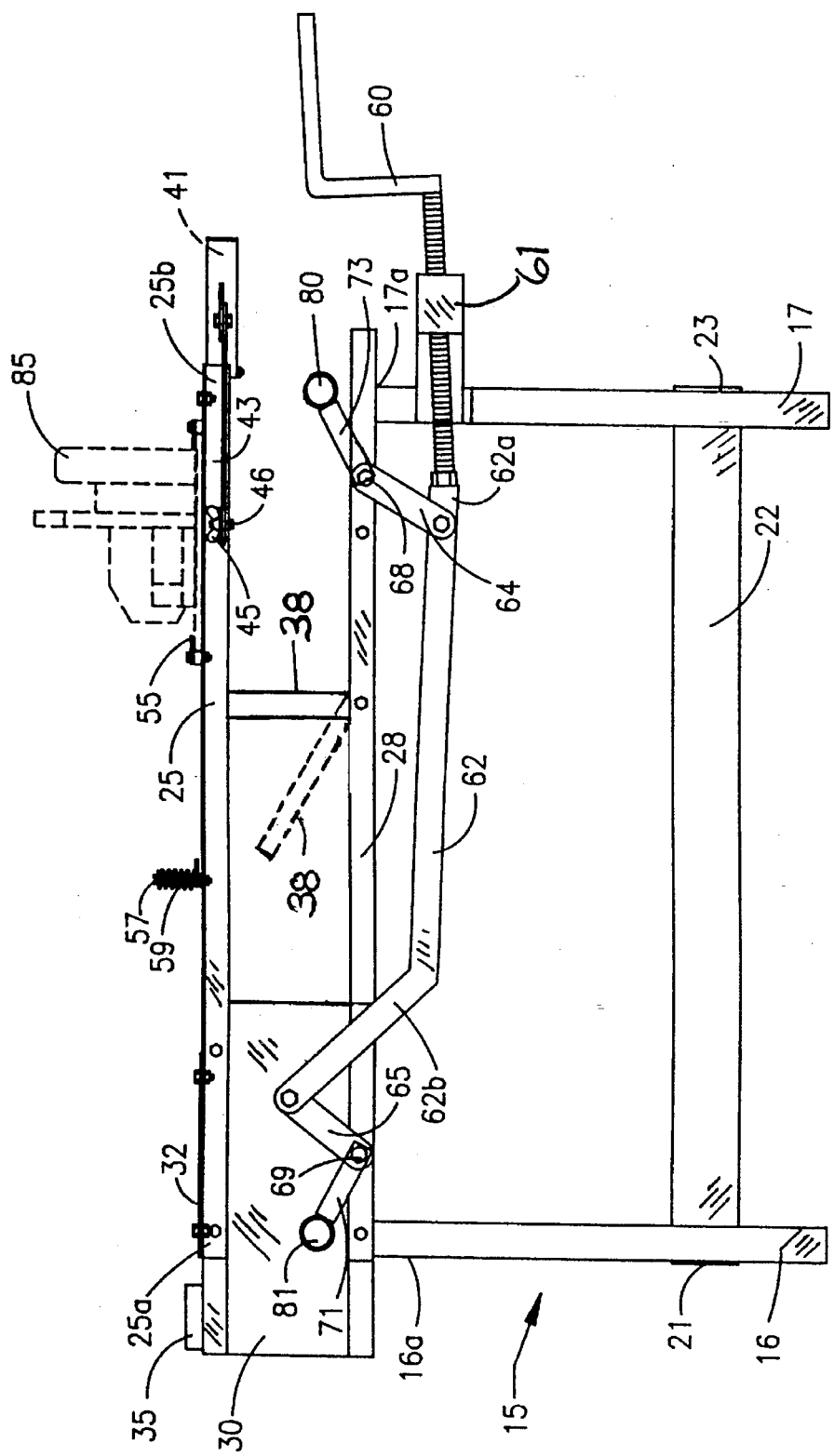
FIG. 2 is a side elevational view of the portable saw guide apparatus.
Figure 4:
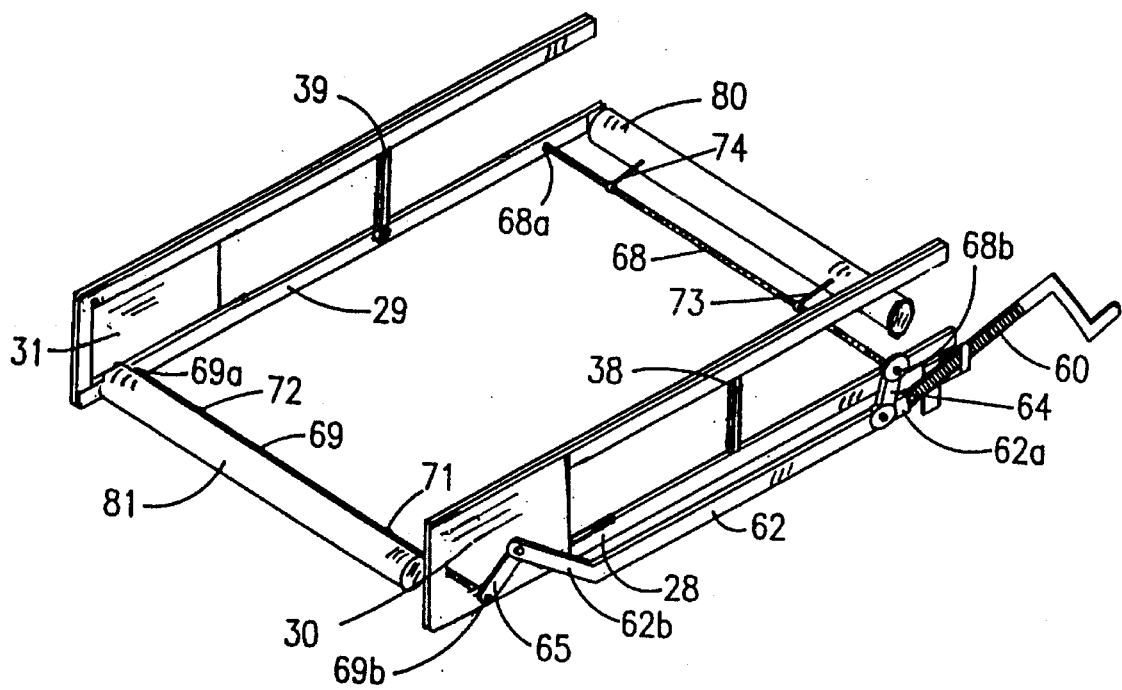
FIG. 4 is a detailed perspective view of the means to vertically adjust the workpiece relative to the power saw of the portable saw guide apparatus.

As shown in FIGS. 1, 2, and 4, the portable saw guide apparatus 10 also comprises a means to vertically adjust the workpiece or structural material relative to the power saw 85, which includes a crank 60 threaded through a crank support member 61 which is fixedly attached to the frame assembly 15; a lever 62 having a first end 62a to which an end of the crank 60 is journaled; two linkage members 64,65 having first ends pivotally attached to the lever 62, one linkage member being attached at a second end 62b of the lever 62 and the other linkage member being attached near the first end of the linkage member; two spindles 68,69 having ends 68a–b, 69a–b, journaled to the two elongate support means 28,29 of the frame assembly 15 and transversely interconnecting the two elongate support means 28,29 for rotation about their longitudinal axes and further having ends 68a,69a which are fixedly attached with bolts and screws as such to the second ends of the linkage members 64,65; four workpiece support mounts 71–74 having ring clamps integral thereto, two of which are aligned in spaced relationship upon one of the spindles 68 and which are fixedly attached with the ring clamps as such and extend generally perpendicular to the longitudinal axis of the spindle 68 and the other two of which are aligned in spaced relationship upon the other spindle 69 and which are fixedly attached also with the ring clamps and extend generally perpendicular to the longitudinal axis of that other spindle 69 for rotation with the spindles; and two cylinder-like workpiece support members 80,81 being fixedly attached or welded to the ends of the workpiece support mounts 71–74 and being spaced from the spindles 68,69 and being transversely disposed in relationship to the elongate support means 28,29 and cantilever arms 25,26 and also having their longitudinal axes generally perpendicular to the workpiece support mounts 71–74 for rotation with the spindles 68,69. As the spindles 68,69 are rotated, the workpiece support members 80,81 rotate with the spindles 68,69 and are adjusted vertically either upward or downward in relationship to the rail means 50,51,52 and the power saw 85 and saw cutting means 86 to allow the user to conveniently cut and shape many different thicknesses of structural materials or workpieces. A workpiece rest 34 can be used to support the workpieces. The workpiece rest is adapted and constructed to be removably mounted upon the workpiece support members 80,81 to conveniently support a workpiece which may be too short to rest directly upon both workpiece support members 80,81. The workpiece rest 34 is mountable below the cantilever arms 25,26 and the rail means 50,51,52 and is preferably a platform made of wood and is adapted to allow the user to cut through the workpiece without also cutting through the workpiece rest 34 itself.

The rail means 50,51,52 and the cantilever arms 25,26 cannot be raised or lowered, but are disposed at a predetermined height above the surface upon which the portable saw guide apparatus 10 is positioned and is spaced from the elongate support means 28,29 of the frame assembly 15. Also, unlike the prior art where the power saw 85 can be raised and lowered relative to the workpiece, the power saw 85 of the present invention is slidably mounted upon the rail means 50,51,52 but cannot be lowered or raised in relationship to the surface upon which the portable saw guide apparatus 10 is positioned and is much safer than the prior art as a result, since most power saw accidents usually occur when the user lowers or raises the power saw in relationship to the workpiece. Instead of raising and lowering the power saw in relationship to the workpiece, the user lowers or raises the workpiece in relationship to the power saw in the present invention which substantially minimizes the possibility of the user cutting his/her fingers, hands, or arms.

To use the portable saw guide apparatus 10, the user should fixedly mount a hand-held power circular saw 85 upon the planer carriage 55 with bolts and screws or the like and should slidably mount the planer carriage 55 and saw 85 upon the rail means 50,51,52 which disposes the cutting means 86 of the saw 85 either parallel to the cantilever arms 25,26 or perpendicular to the cantilever arms 25,26, whichever is desired by the user as determined by the types of cuts or shapes the user wants to make to the workpiece. The user can also slide the power saw 85 upon the rail means 50,51,52 to effect the cuts to a workpiece or the user can thread in the threaded fasteners 56,57 on one of the rail means 52 to immovably secure the power saw 85 at a selected position upon the rail means 50,51,52 and slide the workpiece in relationship to the power saw 85 to effect the cuts and shapes. The user can raise the workpiece relative to the power saw 85 by turning the crank 60 to thread in through the crank support member 61, which urges the lever 62 which urges the linkage members 64,65 which urges the spindles 68,69 to rotate clockwise which uniformly rotates the workpiece support mounts 71–74 and the workpiece support members 80,81 upward relative to the rail means 50,51,52 and the power saw 85. The user can also lower the workpiece relative to the power saw 85 by turning the crank 60 to thread out of the crank support member 61, which urges the lever 62 to move the linkage members 64,65 which rotates the spindles 68,69 counterclockwise which uniformly rotates the workpiece mounts 71–74 and the workpiece support members 80,81 downward relative to the power saw 85 thus allowing the user to cut many different thicknesses of workpieces.

Various changes and departures may be made to the invention without departing from the spirit and scope thereof. Accordingly, it is not intended that the invention be limited to that specifically described in the specification or as illustrated in the drawing but only as set forth in the claims.

What is claimed is:

1. A portable saw guide apparatus comprising:

a frame assembly having a plurality of leg members disposed in spaced relationship to one another and having a pair of elongate support means having ends fixedly attached to said leg members, and further having a pair of cantilever arms spaced apart and parallel to one another and disposed generally horizontally above said leg members and said elongate support means, said cantilever arms also being spaced from said elongate support means, each of said cantilever arms having a first end and a second end, said frame assembly also having at least two arm mounts fixedly attached to said elongate support means, said frame assembly further comprising a pair of adjustable workpiece guide means pivotally attached at said second ends of said cantilever arms for guiding said workpiece at selected angles relative to cutting means of a power saw, a plurality of rail means attached to said frame assembly;

a carriage for supporting said power saw, said carriage slidably and removably mounted upon said rail means; and a means to support and vertically adjust a workpiece relative to said power saw and said rail means.

2. A portable saw guide apparatus as described in claim 1, wherein each of said adjustable workpiece guide means comprises a guide member pivotally attached to said rail means for guiding and supporting said workpiece, a guide arm having a slot therein and being pivotally attached to said guide member, an arm fastening means disposed in said slot of said guide arm which is movable relative to said arm fastening means, to securely fasten said guide member at selected angles relative to said cutting means of said power saw.

3. A portable saw guide apparatus as described in claim 2, wherein said frame assembly further comprises a plurality of arm supports pivotally attached to said elongate support means and capable of further supporting said cantilever arms, said arm supports spaced from said arm mounts.

4. A portable saw guide apparatus as described in claim 1, wherein said rail means are spaced from one another and interconnect said cantilever arms.

5. A portable saw guide apparatus as described in claim 4, wherein at least one of said rail means also comprises a means to immovably secure said carriage thereupon.

6. A portable saw guide apparatus as described in claim 5, wherein said means to immovably secure said carriage upon said rail means comprises at least one threaded fastener threaded through said rail means and a spring disposed about each of said threaded fastener and mounted upon said rail means for urging said rail means into locking engagement to said carriage.

7. A portable saw guide apparatus as described in claim 1, wherein said means to vertically adjust and support said workpiece comprises a crank a lever having a first end and a second end, said crank being journaled to said first end of said lever;

a pair of linkage members having ends pivotally attached to said lever;

a pair of spindles having ends rotatably journaled to said frame assembly and having ends fixedly attached to said linkage members, said spindles being transversely disposed relative to said elongate support means of said frame assembly;

a plurality of workpiece support mounts being fixedly attached to said spindles and being spaced along said spindles and extending outward from said spindles; and a pair of workpiece support members being fixedly attached to said workpiece support mounts and disposed transversely relative to said cantilever arms, for supporting said workpiece and uniformly raising and lowering said workpiece relative to said power saw.

8. A portable saw guide apparatus as described in claim 7, wherein said workpiece support members are spaced from said spindles for rotation therewith, said workpiece support members capable of being adjusted vertically in response to the rotation of said spindles.

9. A portable saw guide apparatus as described in claim 8, wherein one of said linkage members being pivotally attached near said first end of said lever, and the other of said linkage members being pivotally attached at said second end of said lever.

10. A portable saw guide apparatus as described in claim 1, wherein said means to vertically adjust and support said workpiece comprises a crank a lever having a first end and a second end, said crank being journaled to said first end of said lever;

a pair of linkage members having ends pivotally attached to said lever;

a pair of spindles having ends journaled to said frame assembly and having ends fixedly attached to said linkage members, said spindles being transversely disposed relative to said elongate support means of said frame assembly;

a plurality of workpiece support mounts being fixedly attached to said spindles and being spaced along said spindles and extending outward from said spindles;

a pair of workpiece support members being fixedly attached to said workpiece support mounts and disposed transversely relative to said cantilever arms, for supporting said workpiece and uniformly raising and lowering said workpiece relative to said power saw; and a workpiece rest removably mountable upon said workpiece support members for supporting said workpiece.

11. A portable saw guide apparatus as described in claim 10, wherein said workpiece support members are spaced from said spindles for rotation therewith, said workpiece support members capable of being adjusted vertically in response to the rotation of said spindles.

12. A portable saw guide apparatus as described in claim 11, wherein one of said linkage members being pivotally attached near said first end of said lever, and the other of said linkage members being pivotally attached at said second end of said lever.

* * * * *